United States Patent
Haigh

[15] 3,657,060
[45] Apr. 18, 1972

[54] EMBROIDERED EMBLEM WITH THERMOPLASTIC ADHESIVE

[72] Inventor: Thomas I. Haigh, Bucks County, Pa.
[73] Assignee: The Penn Novelty Company, Philadelphia, Pa.
[22] Filed: Aug. 25, 1970
[21] Appl. No.: 66,715

[52] U.S. Cl. ............................161/73, 161/97, 161/119, 161/413, 161/86, 139/426, 156/309
[51] Int. Cl. ...............................B32b 3/02, B32b 3/14
[58] Field of Search..............161/88, 89, 97, 119, 413, 156, 161/152, 73, 116; 156/327, 309; 139/420, 426

[56]  References Cited

UNITED STATES PATENTS

| | | | |
|---|---|---|---|
| 2,765,814 | 10/1956 | Jordon | 139/426 |
| 3,220,916 | 11/1965 | Petropoulos | 161/156 X |
| 3,411,981 | 11/1968 | Thomas | 161/190 |
| 3,383,263 | 5/1968 | Storti | 161/97 X |
| 2,630,395 | 3/1953 | McCullough et al | 161/119 X |
| 3,567,567 | 3/1971 | Sherrill | 161/63 X |

Primary Examiner—Robert F. Burnett
Assistant Examiner—Mark A. Litman
Attorney—Seidel, Gonda & Goldhammer

[57] ABSTRACT

An embroidered emblem which comprises a fabric base with an embroidered design thereon and a thermoplastic material laminated thereto. The emblem can be fastened to a garment by applying sufficient heat and pressure to melt the thermoplastic material. The method for preparing the laminated emblem comprises the steps of applying heat and pressure to the thermoplastic material while it is in contact with the emblem and then permitting it to cool while still under pressure. A similar technique is utilized for bonding the emblem to a garment.

5 Claims, 4 Drawing Figures

PATENTED APR 18 1972   3,657,060

INVENTOR.
THOMAS I. HAIGH
BY
Seidel, Gonda & Goldhammer
ATTORNEYS.

EMBROIDERED EMBLEM WITH THERMOPLASTIC ADHESIVE

DISCLOSURE

This invention relates to an embroidered emblem and more particularly to the arrangement of such emblem and the method of making the same.

Embroidered emblems are well known for their use as identification markers, patches and the like. In this regard they are often sewn onto articles of wearing apparel or other fabric material of a general nature.

Usually, the emblems comprise a span of material which is embroidered with a prearranged design, which may be a trademark, a name, or any arbitrary design, or the like. In the technique of embroidering the embroidery thread appears on both sides of the backing material. This results in substantial unevenness of the emblem both on its front and back sides, since in those areas where the actual embroidering thread is located, the emblem will be relatively thick and between those areas the emblem will be relatively thin.

Emblems have generally been fastened to the garments by sewing. It has been necessary to provide a suitable arrangement for giving the emblem sufficient stiffness so that such sewing could be accomplished with relative ease. This stiffening process requires a number of steps that result in increased cost of the embroidered emblem. Additionally, this technique is unsatisfactory, since after a number of washings the emblems lose their stiffness and become most unattractive. The technique which has been used heretofore for preparing emblems has comprised incorporating a buckram backing onto the emblem to provide stiffness while it is being embroidered. After embroidery takes place the emblem is starched on the buckram side thereof using manual labor and a series of heated rollers. The emblems have to be continuously stretched during the hardening of the starch in order to avoid distortion of the emblem. Once the starch is cured the emblem is die cut to shape and edged for shipment to industrial users. Finally the finished emblem is sewn onto a garment as it is needed.

The many steps outlined above could be avoided if a suitable means for adhesively bonding an emblem to a garment could be achieved. This would substantially reduce the cost of manufacturing these emblems and simultaneously therewith completely eliminate the need for sewing the emblem to a garment since it could be adhesively bonded thereto.

Accordingly, it is an object of this invention to provide a novel and unobvious embroidered emblem.

It is another object of this invention to provide a novel and unobvious embroidered emblem which may be adhesively bonded to a garment.

It is still another object of this invention to provide a novel and unobvious method for making an embroidered emblem which is to be bonded to a garment.

Other objects and advantages of the subject invention will be apparent from a detailed description thereof.

Generally, the invention relates to a method of producing laminated embroidered emblems which may be bonded to garments comprising the steps of overlaying a sheet of thermoplastic material and at least one embroidered emblem, applying sufficient heat and pressure to the thermoplastic material to cause it to melt while it is in intimate contact with the embroidered emblem, and permitting thermoplastic material and embroidered emblem to cool.

The invention also includes an embroidered emblem which is to be bonded to a fabric which includes a fabric base, an embroidered design on the fabric base, and a thermoplastic material laminated to one side of the fabric base.

The invention also relates to a method of bonding an embroidered emblem to garment by heating the emblem and a sheet of thermoplastic material laminated thereto under pressure so that the thermoplastic material melts into the garment and thereafter cooling the emblem while still under pressure.

The invention can best be described by referring to the attached drawing wherein.

The embroidered emblems of the present invention are made by a method which includes laminating a thermoplastic material to the back of a span that comprises a plurality of emblems. The embroidered emblems are then die cut to size.

Figure 1:
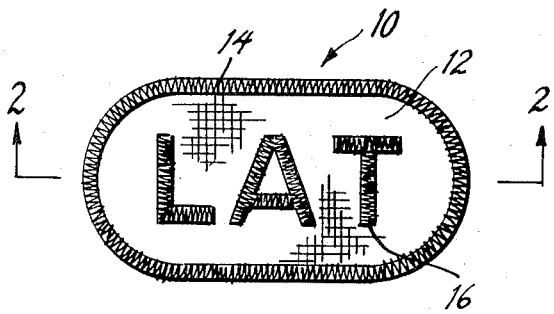
FIG. 1 is a plan view of an embroidered emblem constructed in accordance with a presently preferred form of the invention.
Figure 2:
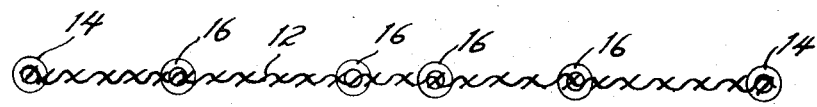
FIG. 2 is a sectional view taken along line 2—2 of FIG. 1.

One such embroidered emblem 10, illustrated in FIG. 1, comprises a woven fabric backing material 12 with an embroidered border 14 thereon. The interior of the emblem is comprised of a suitable embroidered design 16, which may take the form of a trademark or name or any other suitable indicia. In the drawings a plurality of arbitrary letters are shown. Because of the thickness of the embroidering thread, the emblem is of uneven thickness. Thus, in those areas of the emblem where the embroidery appears, the emblem is relatively thick, however, between the embroidered areas the emblem is relatively thin (FIG. 2).

A suitable material to be laminated to the embroidered emblem for subsequent bonding to a garment should be able to withstand a temperature of about 200° F in an alkaline laundering solution, a condition characteristic of most normal industrial washing machines. Additionally, the material should be non-soluble in dry cleaning fluids.

Broadly speaking, the family of thermoplastic or elastomeric urethane polymers, formed from the reaction of polyisocyanates with polyhydric compounds having reactive hydrogens, have been found to satisfy the above-noted criteria. More specifically, thermoplastic films formed from the reaction of a polyisocyanate with a polyester have been found to be particularly resistant to both alkaline laundering solutions and the usual dry cleaning fluids.

For example, suitable polyester based urethane polymers may be formed by reacting a polyisocyanate, such as diphenylmethane 4,4'-diisocyanate (MDI) with a polyester from the reaction of a saturated dibasic acid, such as adipic acid, and a glycol, such as diethylene glycol. Other suitable polyurethane films meeting the desired criteria described above will be readily ascertainable by one of ordinary skill in the art.

A particularly suitable, commercially available polyester based polyurethane of the above type is manufactured by the B. F. Goodrich Chemical Company and is sold under the trademark TUFTANE 310.

A sheet of suitable thermoplastic material 20 is placed in overlying relation to a plurality of embroidered emblems arranged on a span of material so that it lies in intimate contact with the back thereof, the sheet should be about 5 to 12 mils thick.

Figure 3:
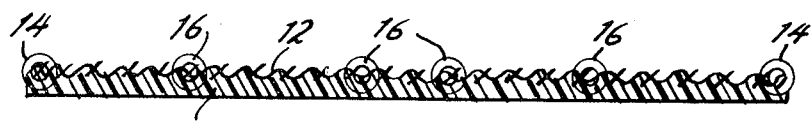
FIG. 3 is a view similar to FIG. 2, but showing an embroidered emblem laminated to thermoplastic material.
Figure 4:
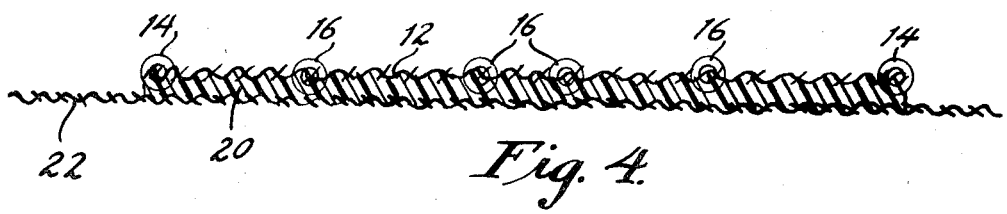
FIG. 4 is a sectional view similar to FIG. 3, however, showing an embroidered emblem bonded to a garment.

At the lower range of thickness there is just enough material to successfully cover all of the high points and low points on the rear face of the emblem (FIG. 3). At a thickness greater than 12 mils there is a tendency for "flash" to form, i.e. thermoplastic material spilling past the edges of the emblems. Optimum results have been achieved at a thickness of 10 mils.

Preferably, the thermoplastic material should melt at a temperature of about 300° F to 375° F.

The laminate of the thermoplastic sheet and the span of embroidered emblems is subjected to a sufficient heat and pressure to melt a portion of the sheet into the back of the emblem. This is achieved by providing a press which has both a heatable platen and cold platen. The front of the embroidered emblems are placed against the cold platen while the sheet of thermoplastic material is placed against the heatable platen. The platens are subjected to pressure and the heatable platen is heated to about 400° F. An impulse heater may be used in order to bring the temperature of the heatable platen up rapidly. This results in a rapid heating of the thermoplastic material to melt it into the back of the embroidered emblems. A yieldable substance such as a silicone rubber or the like may be placed between the cold platen and the front of the embroidered emblems to fill places between the high portions thereof. This will assure that the thermoplastic material uniformly covers the backs of all the emblems.

At a pressure of 30 pounds per square inch platen pressure it takes about five seconds to laminate the thermoplastic sheet to the span of embroidered emblems, however platen pressures in the range of between 20 to 60 pounds per square inch are also satisfactory for lamination. It is to be understood that at higher pressures the heat can be applied for a shorter period of time while at lower pressures the temperature must be substantially increased. The only significant upward limit on the amount of heat is that which will cause the materials to burn. Correspondingly, the only meaningful lower temperature limit is the threshold at which the thermoplastic material will melt. Similarly with regard to the pressure to be applied, it is critical that the thermoplastic sheet and the back of the emblem be in intimate contact with each other. Thus, pressures as low as 20 pounds per square inch platen pressure have been utilized.

After the thermoplastic sheet has been melted into the back of the span of emblems they are subjected to a positive cooling step while still under pressure. Preferably the emblems are immediately cooled to about 150° F to 200° F. This is done to prevent the thermoplastic material from continuing to flow. Continuous pressure is applied to the assembled laminate, since the emblems might have a tendency to separate from the thermoplastic material while it is cooling. Thus, preferably, the laminate should be cooled while under about 30 pounds of platen pressure per square inch. A suitable apparatus for effecting the cooling could comprise a common platen for engaging the emblem and a split platen, including both hot and cold elements for contacting the thermoplastic sheet.

It has been found in tests that when a 10 mil thick film of TUFTANE 310 is at a platen pressure of 30 pounds per square inch and the hot platen is heated to about 450° F, it takes about 5 seconds for the thermoplastic to melt into the embroidered emblems and it takes about another 5 seconds for the emblems and thermoplastic material to be cooled by the cold platen. When separate heating and cooling stations are utilized as described above, the laminate may be conveyed between stations by a polyflurocarbon impregnated glass belt. A preferred flurocarbon is TEFLON. When the belt is employed for moving the laminate between work stations, it has been found that about a two second interval lapses between the release of pressure by the heating platen and the application of pressure by the cooling platen. Thus, the entire laminating process may take a total of about 12 seconds. After the lamination takes place the laminate is conveyed to a die cutting means where each of the separate emblems is cut. The cross sections of an embroidered emblem ready to be bonded to a garment is illustrated in FIG. 3.

The emblem produced by this method is of a stiffness comparable to that achieved by starched buckram heated under pressure rollers. The substantial reduction in the number of manufacturing steps results in an efficient and relatively low cost embroidered emblem. It is significant that the embroidered emblem can be applied to a garment in a few seconds rather than being sewn on as before.

The laminated emblem 10 can be bonded to a garment 12 comprising a fabric or the like by applying sufficient heat to melt the thermoplastic material without damaging the garment. In this regard a temperature in the range of 300° F to 375° F should be reached in a relatively short time in order to permit the laminate to be bonded to the garment without burning the garment. The composite assembly of the laminate and the garment should be cooled while under pressure in order to prevent the laminate from separating from the garment before it is securely bonded thereto.

Thus, what has been described is an embroidered emblem and a method for its manufacture and a method for its securement to a garment. The embroidered emblem can be bonded to a garment by utilizing the thermoplastic material which is attached to the back thereof. After the embroidered emblem is attached to the garment, it is capable of withstanding many washings in alkaline solutions at relatively high temperatures or in dry cleaning liquids without separating from the garment.

While the invention has been described with reference to a particular embodiment and method therefor, it is apparent that many other embodiments and methods would be obvious to those skilled in the arts in view of the foregoing specification, thus the scope of the claims should not be limited by the detailed foregoing description, but rather only by the scope of the claims annexed hereto.

I claim

1. An embroidered emblem to be bonded by heat and pressure to a first fabric by a sheet of thermoplastic material which will be between said embroidered emblem and said first fabric comprising a fabric base, said fabric base having a rear face and a front face, an embroidered design on said fabric base, said embroidered design creating relatively high and relatively low areas on both of said faces on said fabric base, a thermoplastic material laminated to said rear face of said fabric base, and said thermoplastic material being resistant to alkaline laundering solutions and being of sufficient thickness to fill said relatively low areas and cover said relatively high areas on said rear face of said fabric base so that substantially all of said rear face retains contact with said thermoplastic material when said emblem is bonded to said first fabric.

2. An embroidered emblem as defined in claim 1 wherein said thermoplastic material comprises a polyester based isocyanate polyurethane, and said polyester based isocyanate polyurethane is about 10 mils thick and melts at about 300° F.

3. An embroidered emblem as defined in claim 1 wherein said thermoplastic material comprises a polyurethane.

4. An embroidered emblem as defined in claim 1 wherein said thermoplastic material comprises a polyester based isocyanate polyurethane.

5. An embroidered emblem as defined in claim 1 wherein said thermoplastic material melts at at least 300° F and is about 10 mils thick.

* * * * *